M. AMIDON.
HAY-STACKER.
No. 172,684.
Patented Jan. 25, 1876.
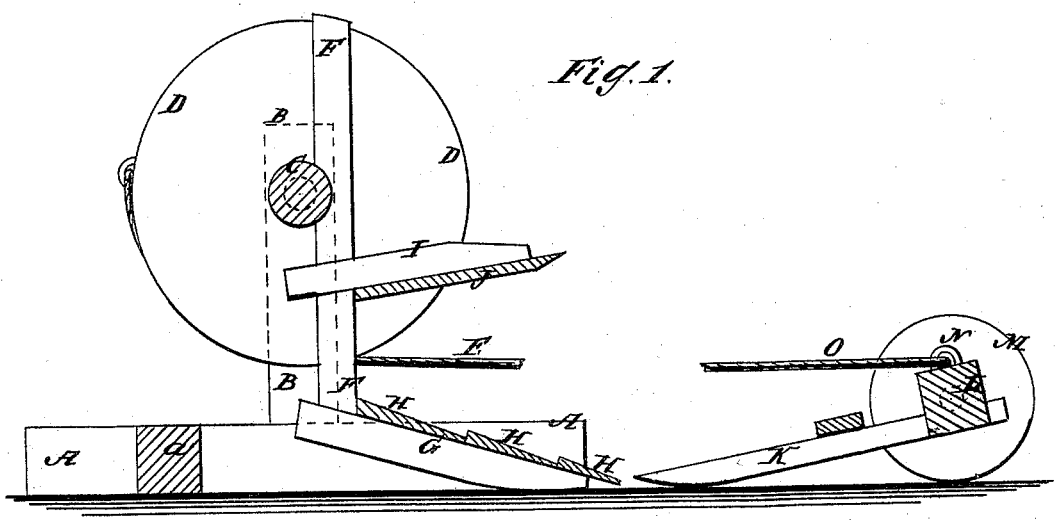
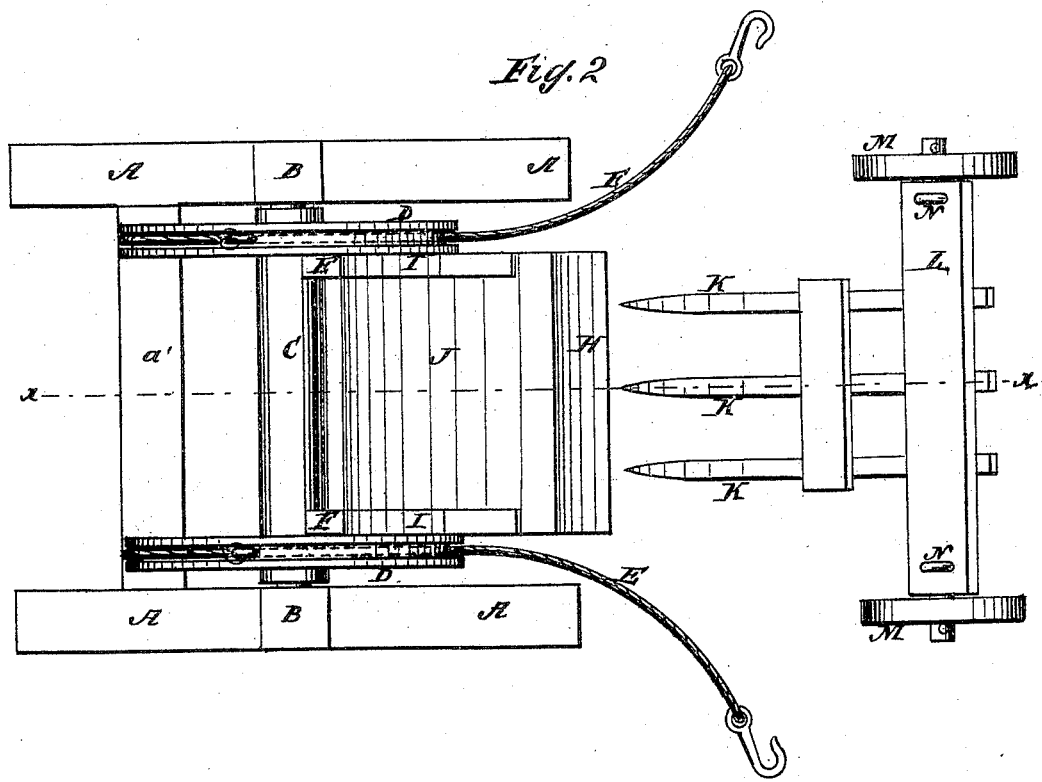

UNITED STATES PATENT OFFICE.

MOSES AMIDON, OF LATHROP, MISSOURI.

IMPROVEMENT IN HAY-STACKERS.

Specification forming part of Letters Patent No. 172,684, dated January 25, 1876; application filed August 6, 1875.

*To all whom it may concern:*

Be it known that I, MOSES AMIDON, of Lathrop, in the county of Clinton and State of Missouri, have invented a new and useful Improvement in Hay-Stacker, of which the following is a specification:

Figure 1 is a vertical section of my improved device, taken through the line $xx$, Fig. 2. Fig. 2 is a top view of the same.

Similar letters of reference indicate corresponding parts.

The object of this invention is to furnish an improved device for stacking hay, which shall be simple in construction and convenient in use, depositing the hay upon the stack very quickly.

The invention consists in the combination of the hopper, the wheels and shaft, and the ropes with the supporting frame-work, to adapt the device for use in connection with a hay-rake, as hereinafter fully described.

The base-frame of the stacker consists of two sills, A, connected at or toward their forward ends by a cross-sill, $a'$.

To the middle parts of the sills A are attached the lower ends of two posts, B, in bearings in the inner sides of the upper ends of which revolve the journals of the shaft C.

To the shaft C, near its ends, are attached large wheels D, the faces of which are grooved to receive the ropes E, which are wound one or more times around them. One end of the ropes E is rigidly attached to the face of the wheels D, and their other ends are provided with hooks. To the shaft C or wheels D are attached bars F, the outer ends of which, when turned downward, come close to the ground. To the bars F, near their outer ends, are attached arms G, the lower ends of which are beveled off, and rest upon the ground, when the bars F are turned downward. To the arms G are attached boards H, forming an inclined platform. To the bars F, a little above the arms G, are attached arms I, which incline upward about as much as the arms G incline downward, and have boards J attached to them.

The bars F and the arms G I and their boards H J form a hopper to receive the hay.

K are the teeth. L is the shaft, and M are the wheels, of a hay-rake.

To the rake-shaft L, near its ends, are attached staples or eyebolts N, to which are attached the ends of the draw-ropes O.

The rake is drawn by two horses attached to the ends of the draw-ropes O. The horses are not connected together, and each of them is ridden by a boy.

In using the device, the rake is drawn over the field until loaded. The loaded rake is drawn upon the platform G H, the horses passing upon the opposite sides of the base-frame A $a'$. The horses are then turned around outward, and the rake is drawn from the platform, leaving the rake-load of hay within the hopper. As the rake passes from the platform G H the horses are stopped, and the hooks of the ropes E are hooked into the eyes N of the rake. The horses are then started forward, which turns the wheels D and shaft C, causing the hopper F G I H J to carry the hay over the shaft C and discharge it upon the stack. The ropes E are then detached from the rake, the rake is drawn off to collect another load, and the stacker is turned back into its former position, ready to receive the next rake-load.

Having thus described my invention, I claim as new and desire to secure by Letters Patent—

The combination of the hopper F G I H J, the wheels D, shaft C, and the ropes E with the frame-work A $a'$ B, substantially as herein shown and described.

MOSES AMIDON.

Witnesses:
GEO. A. PATCH,
J. O. DANIELS.